(12) United States Patent
Robinson et al.

(10) Patent No.: US 8,379,143 B2
(45) Date of Patent: *Feb. 19, 2013

(54) ELECTRONIC DEVICE HAVING A CAMERA AND METHOD OF CONTROLLING A FLASH

(75) Inventors: James Robinson, Elmira (CA); Marc Drader, Waterloo (CA); Michael Purdy, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,872

(22) Filed: Jun. 12, 2012

(65) Prior Publication Data

US 2012/0249864 A1 Oct. 4, 2012

Related U.S. Application Data

(63) Continuation of application No. 12/179,718, filed on Jul. 25, 2008, now Pat. No. 8,223,260.

(51) Int. Cl.
*H04N 2/222* (2006.01)
(52) U.S. Cl. ..................... 348/371; 348/333.1
(58) Field of Classification Search .................. None
See application file for complete search history.

(56) References Cited

U.S. PATENT DOCUMENTS

| | | | |
|---|---|---|---|
| 4,323,952 A | 4/1982 | Proske | |
| 4,325,621 A | 4/1982 | Iwata et al. | |
| 5,614,970 A | 3/1997 | Takagi et al. | |
| 6,081,076 A | 6/2000 | Ogawa | |
| 7,616,881 B2 | 11/2009 | Liang et al. | |
| 7,755,672 B2 | 7/2010 | Pertsel | |
| 7,801,438 B2 | 9/2010 | Khuntia | |
| 8,223,260 B2 * | 7/2012 | Drader et al. | 348/371 |
| 2005/0068457 A1 * | 3/2005 | Yamamoto et al. | 348/370 |
| 2005/0134723 A1 | 6/2005 | Lee et al. | |
| 2007/0047945 A1 | 3/2007 | Nose et al. | |
| 2007/0121072 A1 | 5/2007 | Misawa et al. | |

FOREIGN PATENT DOCUMENTS

| | | |
|---|---|---|
| EP | 1701590 A2 | 9/2006 |
| JP | 08-201886 | 8/1996 |
| JP | 2005241814 A | 9/2005 |
| JP | 2007108427 A | 4/2007 |
| WO | 2006129777 A1 | 12/2006 |
| WO | 2008035234 A1 | 3/2008 |

OTHER PUBLICATIONS

Extended European Search Report dated Sep. 17, 2008, issued from the corresponding EP patent application No. 08161160.0.
Rittgers, William John, et al., "Selective Matrix Flash" Research Disclosure, Feb. 2006, pp. 1-2.

* cited by examiner

*Primary Examiner* — Albert Cutler
(74) *Attorney, Agent, or Firm* — Geoffrey deKleine; Borden Ladner Gervais LLP (57) ABSTRACT

A method of controlling a flash output for capturing an image in a portable electronic device having a digital camera includes receiving light at an image sensor, determining a flash output adjusted for color and brightness based on the light received at the image sensor, providing the flash output, and capturing a resultant image at a digital image processor.

19 Claims, 8 Drawing Sheets

ELECTRONIC DEVICE HAVING A CAMERA AND METHOD OF CONTROLLING A FLASH

CROSS REFERENCE TO RELATED APPLICATIONS

This application is a continuation of U.S. application Ser. No. 12/179,718 filed Jul. 25, 2008, the entire content of which is incorporated herein by reference.

FIELD OF TECHNOLOGY

The present application relates to portable electronic devices including digital camera components and the control of a flash during photography.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Portable electronic devices can also include digital cameras as advances leading to decreased size of digital camera components have provided easier integration in devices that are generally intended for handheld use and ease of portability. Portable electronic devices can also include a flash component for providing additional light during photography in low-light locations, such as indoors.

Flash devices such as LED flashes used in such portable electronic devices provide additional light in a compact size. Image quality using an LED flash varies, however, depending on a number of factors including, for example, general ambient lighting and localized lighting within the image view.

The inclusion of digital cameras has proven to be a popular addition to portable electronic devices and improvements in such digital camera components are driven by consumer desire for better image quality and increased resolution.

BRIEF DESCRIPTION OF THE DRAWINGS

Embodiments of the present application will now be described, by way of example only, with reference to the attached Figures, wherein.

DETAILED DESCRIPTION

Generally, described is a portable electronic device including a digital camera module and a method of controlling a flash output for capturing an image. In one embodiment, the camera module includes an optical system connected to a housing of the portable electronic device for passing light therethrough and an image sensor for receiving light from the optical system. A flash output arrangement is disposed in the housing for emitting a flash of artificial light, and a processing system adjusts the flash output arrangement for colour and brightness based on the light received at the image sensor when capturing a digital image.

It will be appreciated that for simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limited to the scope of the embodiments described herein.

The application generally relates to an electronic device, which in the embodiments described herein is a portable electronic device. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Figure 1:
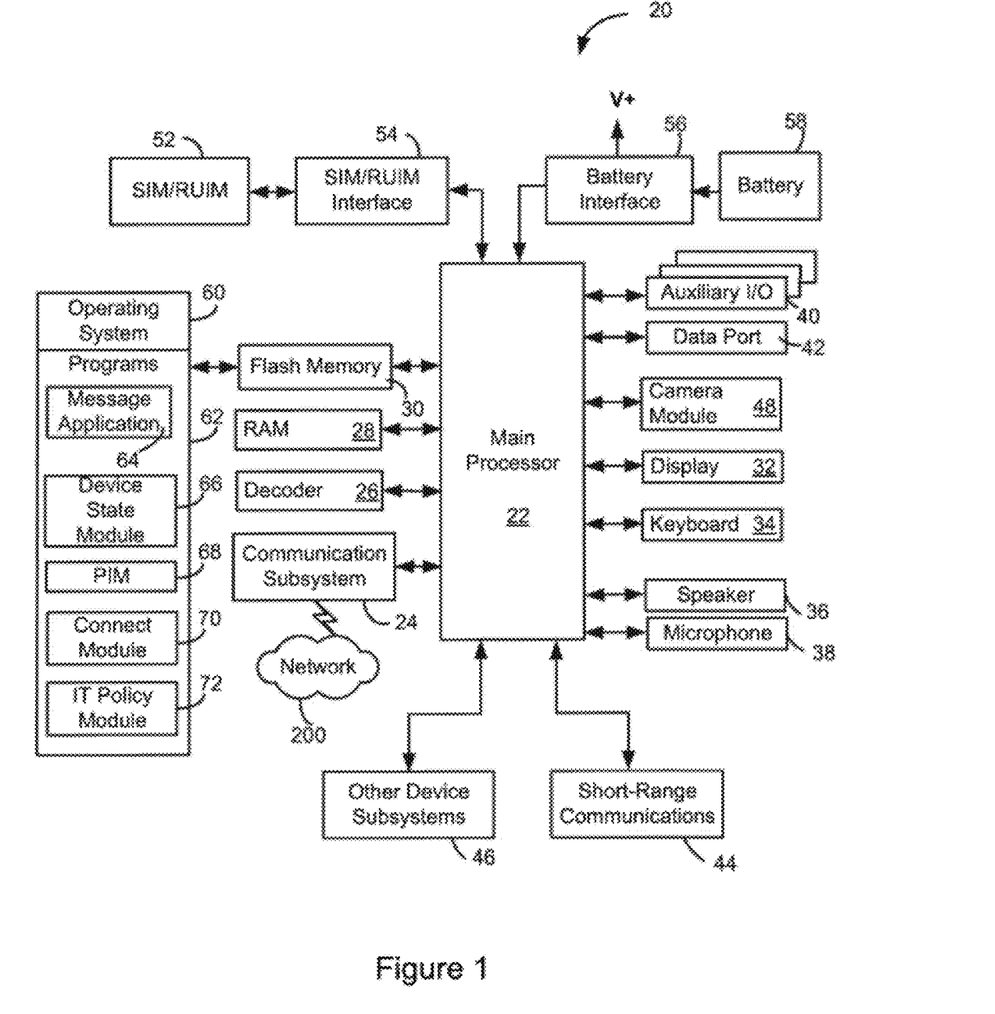
FIG. 1 is a simplified block diagram of components of a portable electronic device according to an embodiment.

Reference is first made to FIG. 1, which shows a block diagram of an exemplary embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 200. In this exemplary embodiment of the portable electronic device 20, the communication subsystem 24 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 24 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 interacts with additional subsystems such as a Random Access Memory (RAM) 28, a flash memory 30, a display device 32, a keyboard 34, a speaker 36, a microphone 38, an auxiliary input/output (I/O) subsystem 40, a data port 42, short-range communications 44 and other device subsystems 46. In the present embodiment, the processor 22 also interacts with the camera module 48 described below.

Some of the subsystems of the portable electronic device 20 perform communication-related functions, whereas other subsystems may provide "resident" or on-device functions. By way of example, the display device 32 and the keyboard 34 may be used for both communication-related functions, such as entering a text message for transmission over the network 200, and device-resident functions such as calculator or task list functions.

The portable electronic device 20 can send and receive communication signals over the wireless network 200 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 200. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 200 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 to 72 which are described in more detail below. The operating system 60 and the software components 62 to 72 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62 to 72, such as specific device applications, or parts thereof, may be temporarily loaded into a volatile store such as the RAM 28. Other software components can also be included, as is well known to those skilled in the art.

The subset of software applications 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the portable electronic device subscriber's corresponding data items stored or associated or both stored and associated with a host computer system. This functionality creates a mirrored host computer on the portable electronic device 20 with respect to such items. This can be particularly advantageous when the host computer system is the portable electronic device subscriber's office computer system.

The portable electronic device 20 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 200, the auxiliary I/O subsystem 40, the data port 42, the short-range communications subsystem 44, or any other suitable device subsystem 46. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 44 provides for communication between the portable electronic device 20 and different systems or devices, without the use of the wireless network 200. For example, the short-range communications subsystem 44 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display device 32 or alternatively to the auxiliary I/O subsystem 40. A subscriber may also compose data items, such as e-mail messages, for example, using the keyboard 34 and possibly the auxiliary I/O subsystem 40. The auxiliary subsystem 40 may include devices such as: a mouse, track ball, infrared fingerprint detector, or a roller wheel with dynamic button pressing capability. A composed item may be transmitted over the wireless network 200 through the communication subsystem 24.

For voice communications, the overall operation of the portable electronic device 20 is substantially similar, except that the received signals are output to the speaker 36, and the microphone 38 generates signals for transmission. Alternative voice or audio I/O subsystems, such as a voice message recording subsystem, can also be implemented on the portable electronic device 20. Although voice or audio signal output is accomplished primarily through the speaker 36, the display device 32 can also be used to provide additional information such as the identity of a calling party, duration of a voice call, or other voice call related information.

Figure 2:
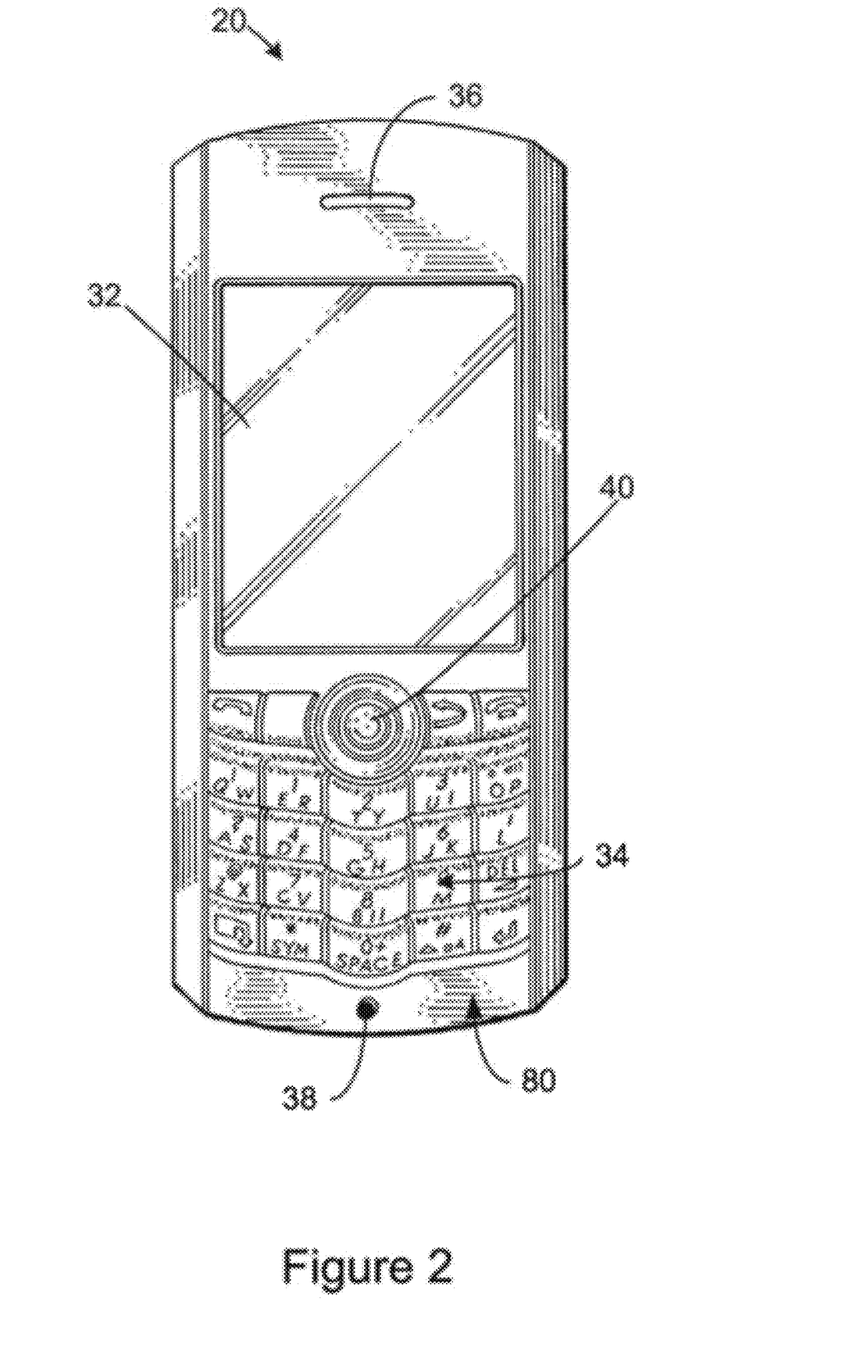
FIG. 2 is a front view of a portable electronic device according to an embodiment.
Figure 3:
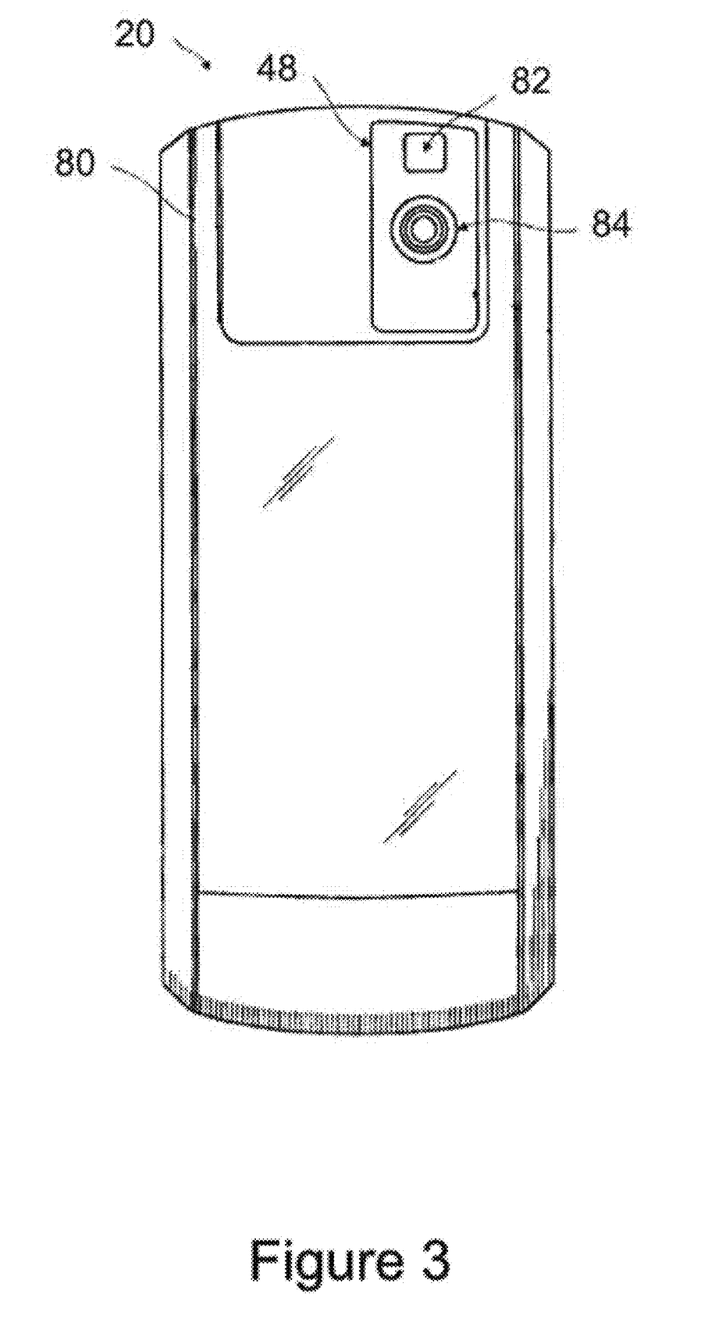
FIG. 3 is a rear view of the portable electronic device of FIG. 2.

Referring now to FIGS. 2 and 3 there is shown a front view and a rear view, respectively, of an exemplary portable electronic device 20 according to an embodiment. The portable electronic device 20 according to the present example includes a housing 80 and the display device 32 framed by the housing 80. The portable electronic device 20 includes the speaker 36, the microphone 38, and an auxiliary I/O subsystem 40 in the form of a trackball. In the present example, the keyboard 34 includes a number of keys including alphanumeric keys and other functional keys. The housing 80 is made from a suitable material as will occur to those skilled in the art and can be stored, for example, in a holster (not shown) that includes an attachment for attaching to a user's belt.

The portable electronic device 20 also includes the camera module 48 that includes a flash output arrangement 82 and an image capturing system 84 both framed by the housing 80. The image capturing system 84 includes a number of components including an optical system of lenses, an image sensor, a controller and an image processor. It will be appreciated that associated software for controlling the camera module 48 resides on the portable electronic device 20, in the programs 62 at the flash memory 30. By pressing, for example, a key on the keyboard 34 or by selecting a corresponding on-screen menu option or icon, the camera module 48 is turned on as the camera application is launched. The camera module 48 is employed for taking still images by, for example, pressing a key on the keyboard 34 or by pressing the auxiliary I/O subsystem 40 trackball shown in FIG. 2. It is contemplated that the camera module 48 can be also used for capturing video images. When a picture is taken, the image is displayed on the display device 32 and the user can be provided with options such as the option to discard or delete the picture, save the picture to, for example, flash memory 30 and others.

The associated camera application can permit user interaction with the camera module 48 such as zooming in and out using the keyboard 34 or auxiliary I/O subsystem 40, changing the resolution of the captured image, or turning the flash output arrangement 82 on, off or to an automatic setting, for example.

Pictures taken using the camera module 48 can be stored in any suitable format in the flash memory 30, for example, and can be retrieved for viewing, for setting as a background on the display device 32, or for sending as an attachment in a message. It will be appreciated that a picture application can also be provided as part of the programs 62 at the portable electronic device 20 for facilitating management of stored pictures.

When the camera module 48 is in use and the associated camera application is running, other functions can still be performed at the portable electronic device 20. For example, electronic messages can still be received at the portable electronic device 20.

Figure 4:
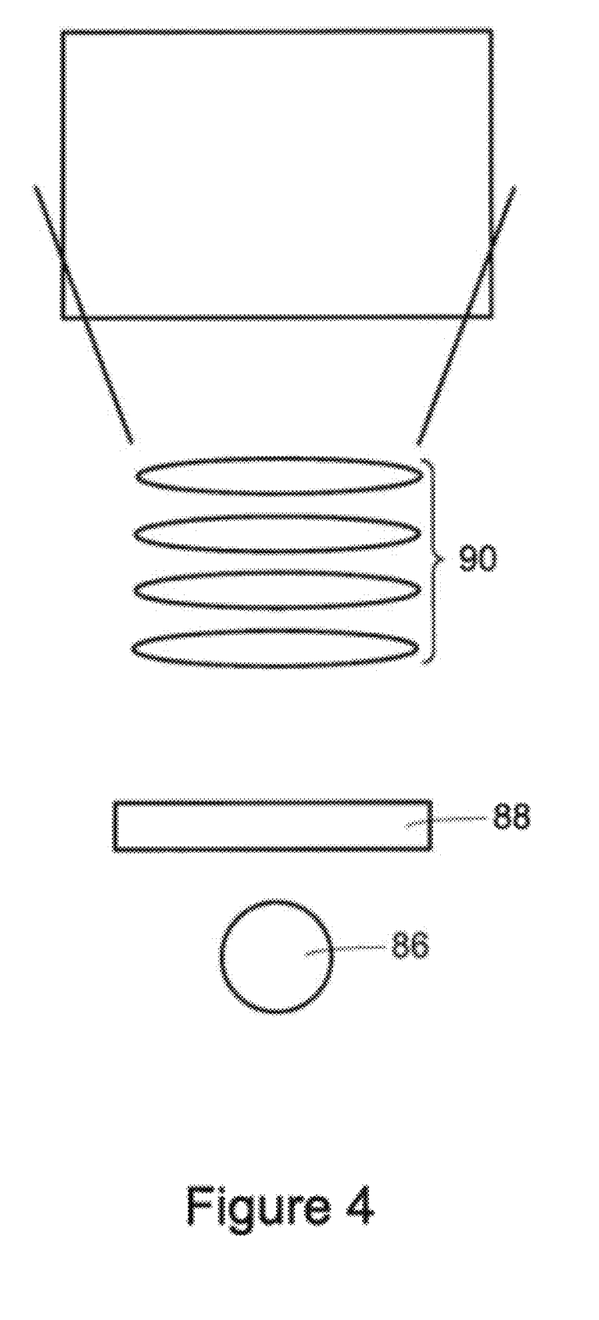
FIG. 4 is a simplified schematic view of portions of a flash output arrangement according to an embodiment.

Reference is now made to FIG. 4 to describe components of the flash output arrangement 82. As shown, the flash output arrangement 82 is in the form of a micro-projector for projecting light therefrom. In the present embodiment, the micro-projector includes a white LED light source 86, a micro-liquid crystal display (micro-LCD) 88 for conditioning the LED light source 86 and a lens array 90 aligned in an axis, for providing a flash. The lens array 90 is covered by a protective cover that is exposed by the housing 80. The micro-LCD 88 permits colour and luminance conditioning and control across the full field of the image for providing a generally uniform luminance and colour across the image field. Thus, a yellow light can be provided by colouring the micro-LCD 88 to thereby colour the light from the LED light source 86. Similarly, the luminance can be controlled in localized areas across the full field of the image by varying the luminance in localized areas on the micro-LCD 88, thereby varying the luminance across the field of the image. Therefore, the flash output can be controlled to aid in correcting vignetting, a reduction of image luminance or saturation at the periphery compared to the image center. In this example, the luminance is varied by controlling the flash output from the LED light source 86 using the micro-LCD 88 to provide a more uniform luminance across the field of the image.

Figure 5:
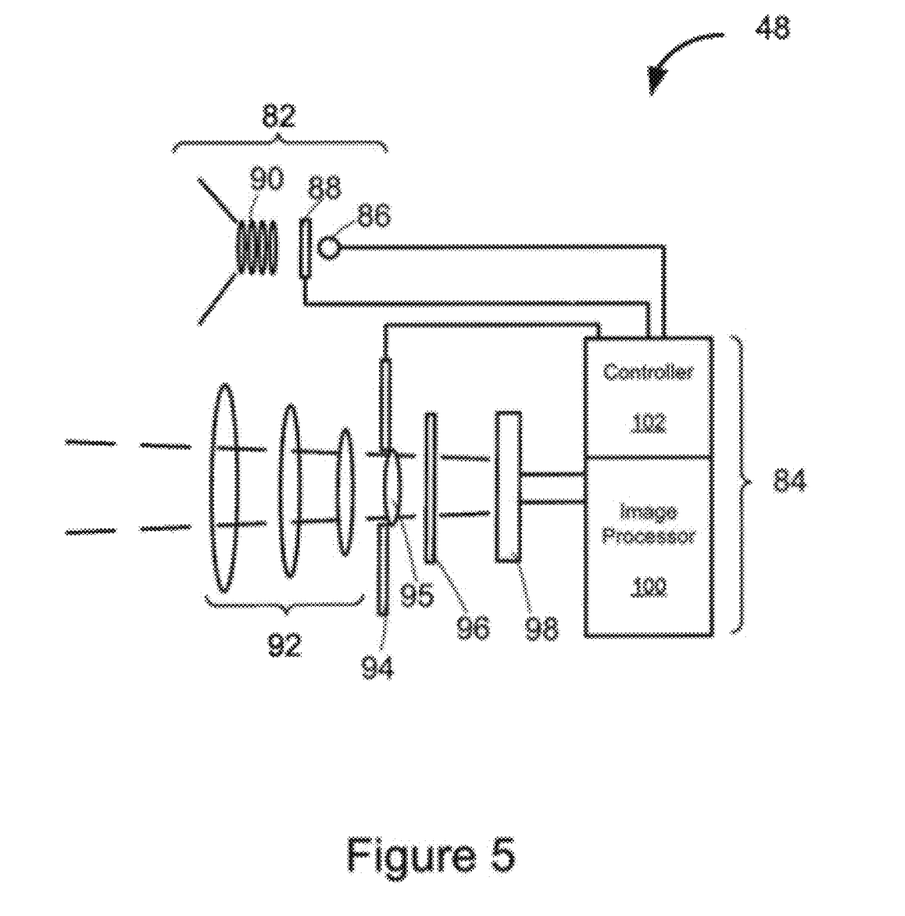
FIG. 5 is a simplified schematic view of portions of a camera module including the flash output arrangement of FIG. 4.

Reference is now made to FIG. 5 to further describe the camera module 48. As indicated, the camera module 48 includes the flash output arrangement 82 and the Image capturing system 84. In the present embodiment, the flash output arrangement 82 includes the LED light source 86, the micro-LCD display 88 and the lens array 90, as described with reference to FIG. 4. It will be appreciated that the present application is not limited to the LED light source 86 and micro-LCD 88 as any suitable micro-projector can be used for providing a controlled flash. A simplified image capturing system 84 is shown in FIG. 5 and includes lenses 92 through which light passes. The outermost one of the lenses is covered by a suitable protective surface for protecting the lenses 92 as the lenses 92 are exposed by the housing 80. The light passes from the lenses 92 through a shutter 94, through a suitable fixed diaphragm 95, through a band-pass filter 96 for filtering out, for example, high and low frequency light while allowing visible light to pass through, and to an image sensor 98. In the present example, the camera module includes the mechanical shutter 94. Alternatively, the camera module can be constructed without a mechanical shutter 94. An image processor 100 is connected to the image sensor 98 for capturing an image and a controller 102 controls the flash output arrangement 82 to provide adjusted flash output. In the present embodiment, the controller 102 is a functional unit that forms part of the image processor 100. It will be appreciated that the controller 102 can be a separate unit connected to the image processor 100, however. Those skilled in the art will understand that other features or functional units such as timer and driver components are also provided. Such features and functional units are not shown in FIG. 5 for the purpose of clarity of illustration and description.

The lenses 92, the shutter 94, and the diaphragm 95 together receive light when the camera module 48 is in use and direct light through the filter 96 toward the image sensor 98. The shutter 94 can control the amount of light that is allowed to pass through the lenses 92 to the image sensor 98. The image processor 100 determines, based on the received light, the luminance characteristics of the light and the colour characteristics of the light. The luminance characteristics can include, for example, localized over-bright areas and localized dark (under-bright) areas. The colour characteristics can include the colour of the ambient light (relative luminance of primary colour components) passing through the lenses 92 to the image sensor 98.

The image sensor 98 includes, for example, a charge coupled device (CCD) sensor surface for receiving the light that passes through the lenses 92, shutter 94, fixed diaphragm 95, and filter 96. The light received at the image sensor 98 is converted to electrical signals by photo-electric conversion of light received at each pixel of the sensor surface of the image sensor 98 to a signal. The signals from all of the pixels together form an image signal that is used in creating the digital image on the LCD display device 32 of the portable electronic device 20. Thus, each pixel of the sensor surface is sensitive to each of the primary colour components and to the luminance of the light for conversion into a signal that forms part of the image signal.

The image processor 100 receives the signals that form the image signal from the image sensor 98 and processes the signals to determine the colour characteristics and the luminance characteristics referred to above. Based on the colour characteristics and luminance characteristics of the image signal, the controller 102 controls the flash output arrangement 82. The image processor 100 determines if the flash output arrangement 82 is to be used based on the luminance level of the signals that together form the image signal. It will be appreciated that the image processor 100 determines if the flash output arrangement 82 is to be used if the flash output is determined automatically, for example, by setting the flash to an automatic setting. The controller 102 then controls the flash output arrangement 82 accordingly. The image processor 100 also determines the colour characteristics (relative luminance of primary colour components) of the light including determining the colour of the ambient light and, based on the colour characteristics, the controller 102 conditions the flash accordingly. Thus, the controller 102 colours the light of the flash based on the colour of the ambient light by controlling the micro-LCD 88 to filter the light from the LED light source 86. The image processor 100 further determines the luminance characteristics of the signals and conditions the flash accordingly. Thus, the controller 102 controls the micro-LCD 88 to attenuate the light of the flash in localized regions across the flash field to provide darker and brighter areas of the flash and thereby provide better uniformity to the level of luminance across all areas of the image.

The speed of the shutter 94 can be controlled by the controller 102 for controlling the amount of light that passes through to the image sensor 98. Alternatively, the light received at the image sensor can be controlled electronically based on time of exposure of the lines of the image sensor 98 to light before reading out. Thus, the shutter 94 is optional.

Figure 6:
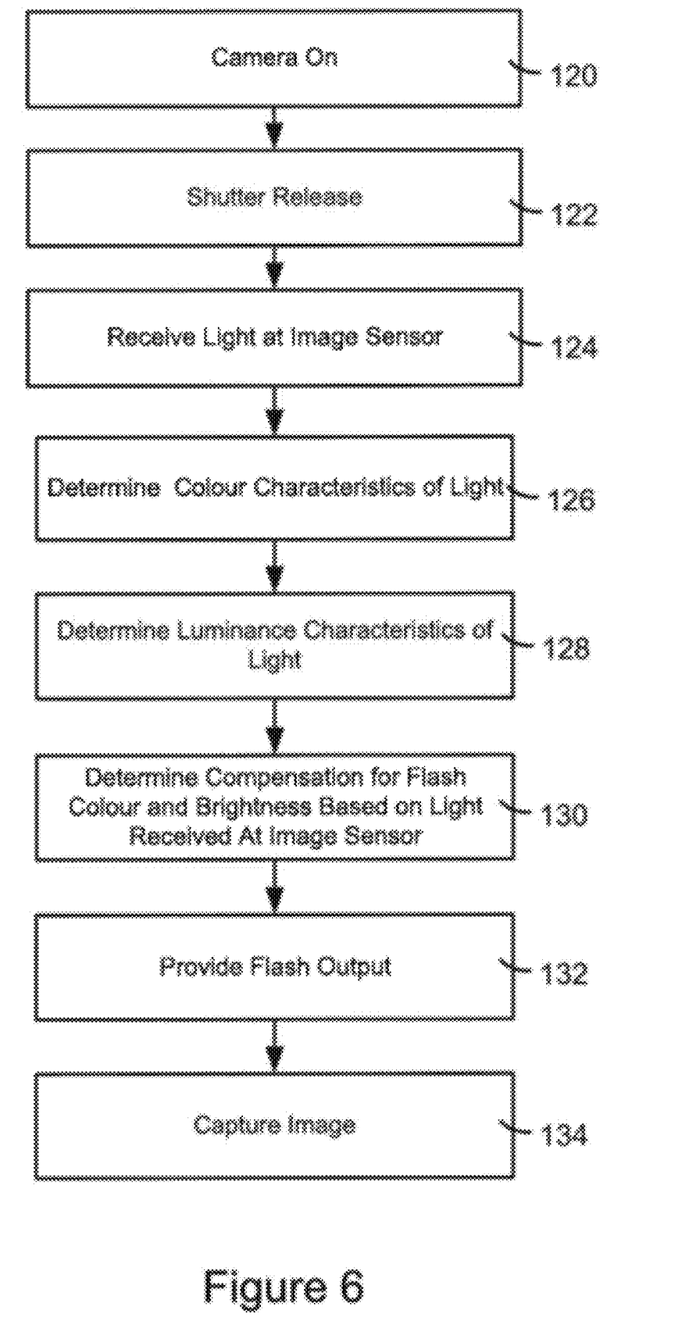
FIG. 6 is a flow chart showing steps in a method of controlling a flash output according to an embodiment.

Reference is now made to FIG. 6 to describe a method of controlling the flash output arrangement 82 according to one embodiment. The camera module 48 is turned on in any suitable manner (step 120). For example, the camera module 48 can be turned on by user-selection of an icon from a menu screen displayed on the LCD display 32 of the portable electronic device 20. To capture an image, a shutter release button is depressed (step 122). Again, the shutter release button can be any suitable button on the portable electronic device 20, such as the auxiliary I/O subsystem 40, which in the embodiment shown in FIG. 2 is a trackball. It will be appreciated that pressing the shutter release button results in the opening of the shutter 94 (where a mechanical shutter is present). Thus, light enters the lenses 92, passes through the shutter 94 and fixed diaphragm 95, and through the band-pass filter 96 and is received at the image sensor 98 (step 124).

The colour characteristics of the light are then determined at the image sensor 98 by determining the colour or relative luminance of primary colours of the ambient light (step 126). The luminance characteristics are also determined at the image sensor 98, thereby determining the luminance at localized area (step 128). From the light received at the image sensor 98, the image processor 100 determines if a flash is to be used. Thus, when the flash output arrangement 82 is set to automatic, the image processor 100 determines if the light received at any localized area is less than a predetermined value and, if so, the flash output arrangement is used. Thus, the flash output arrangement 82 is used and the light from the LED light source 86 is conditioned based on the determined colour characteristics and luminance characteristics (step 130). As referred to above, the colour of the flash is conditioned by the micro-LCD 88 based on the colour of the ambient light. Thus, the micro-LCD 88 filters the light from the LED light source 86. Further, the luminance is conditioned in localized areas by attenuating the light permitted to pass through localized areas of the micro-LCD 88, thereby varying the transmitted light from the LED light source 86. The luminance is determined and the micro-LCD 88 is adjusted to provide the inverse transform to thereby permit more light from the LED light source 86 to brighten dark areas while permitting less light from the LED light source 86 for bright areas. Thus, the luminance profile is determined and the micro-LCD 88 is used to provide the inverse profile from the LED light source 86. The micro-LCD 88 is turned on and the colour and luminance is controlled based on the colour characteristics and luminance characteristics of the light received at the image sensor at step 124. The flash output is provided from the LED light source 86 as conditioned by the micro-LCD 88 (step 132) and the image is captured at the image processor 100 (step 134).

In one example, an incandescent light source in a house does not provide sufficient lighting for a captured image. Typical incandescent light has a colour temperature of about 2700K. These colour characteristics of the light are determined at step 126. The LED light source 86 can be, for example, about 5000K. Thus, the micro-LCD 88 conditions the light output to appear closer to 2700K (yellow light) at step 130 by filtering the light and the filtered flash output is provided at step 132. Thus, the lighting in the captured image is generally consistent.

Figure 7:
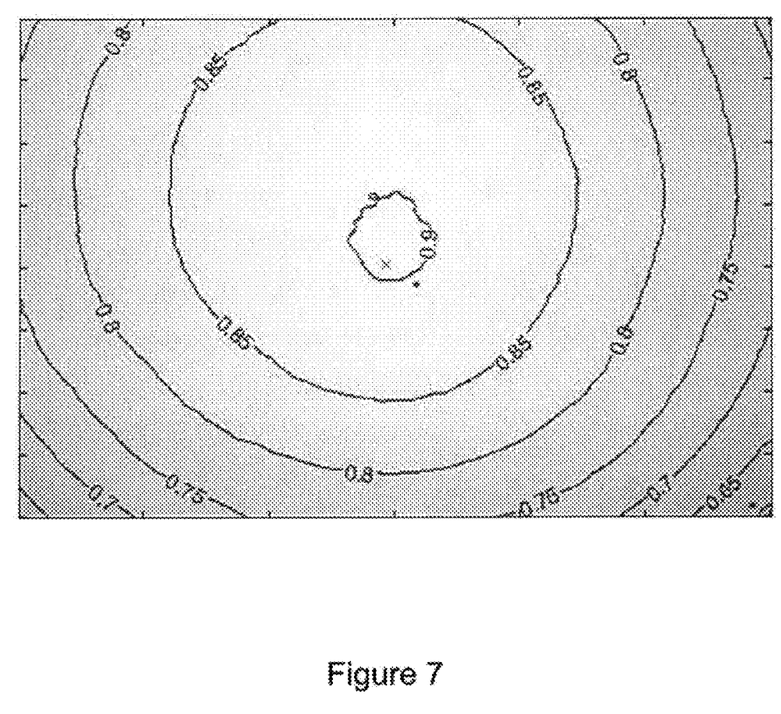
FIG. 7 shows exemplary luminance contours for an image field with vignetting.

In another example, the luminance of the light received at the image sensor at step 124 varies such that the image luminance or saturation at the periphery is reduced as compared to the luminance at the center (vignetting). Therefore the corners of the field are darker. Luminance contours are shown for one exemplary field in FIG. 7. As shown, the center of the field is brightest while the corners are less bright. In this example, the luminance characteristics are determined at step 128 and the micro-LCD 88 is set to condition the light output from the flash for better uniformity of brightness by darkening the center while providing more light at the corners (step 130). The flash output is provided at step 132 and the image captured at step 134.

Figure 8:
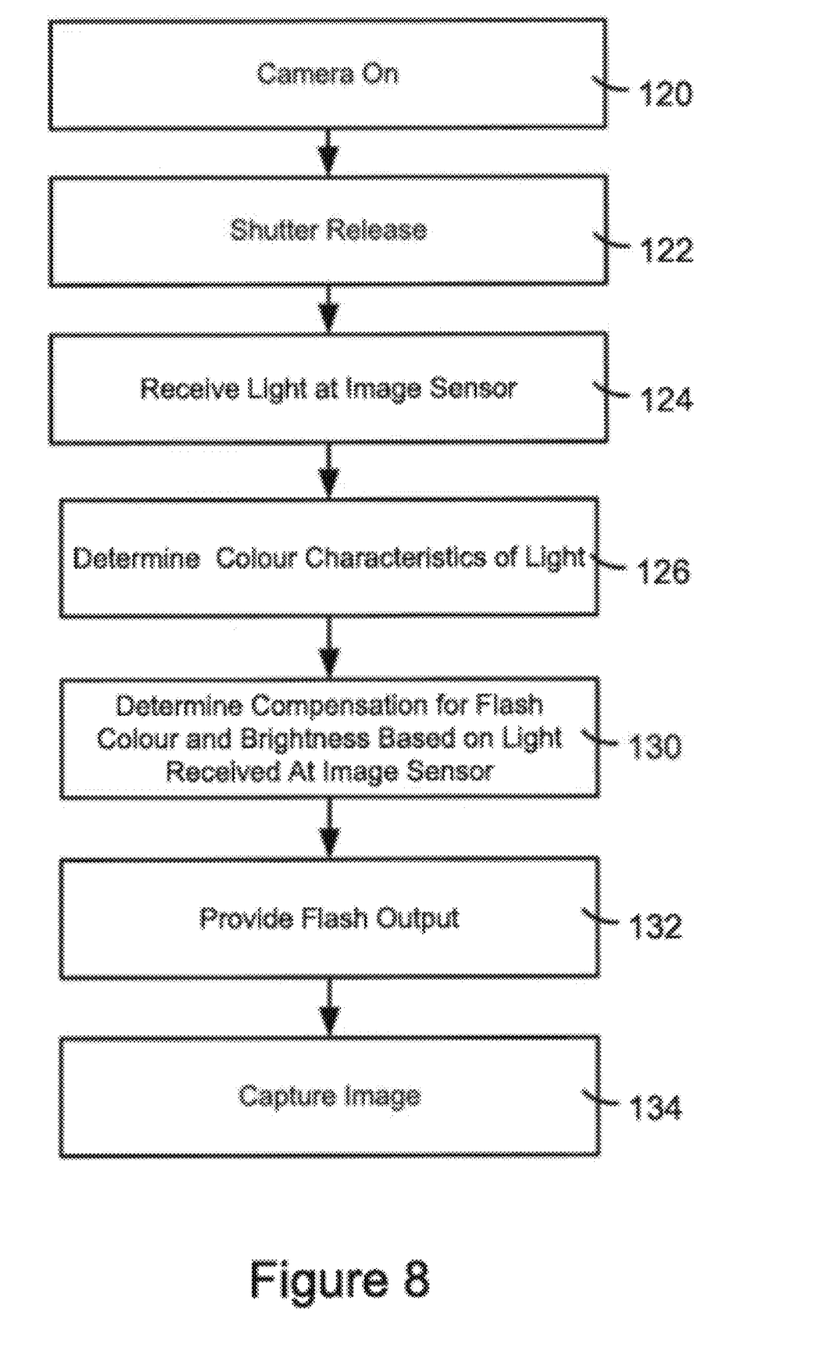
FIG. 8 is a flow chart showing steps in a method of controlling a flash output according to another embodiment.

Reference is now made to FIG. 8 which shows another embodiment of the present application. In the present embodiment, the steps are similar to those shown in FIG. 6 with the exception that the luminance characteristics of the light are not determined. Instead, the luminance characteristics of the light are generally known and the light from the flash is conditioned based on pre-settings using the micro-LCD 88 to compensate. In other words, the luminance profile is generally known in advance based on the camera module components and the luminance profile that results is compensated for using, for example, factory settings. Thus, luminance profiles, for example, from vignetting in which the brightness or saturation of the image is reduced at the periphery, can be compensated for using the micro-LCD to condition the light from the flash based on a known luminance profile. Thus, the light from the LED light source 86 is conditioned based on the determined colour characteristics of the light received and based on a previously known luminance profile (step 130). The remainder of the steps shown in FIG. 8 are similar to those previously described with reference to FIG. 6 and are therefore not described again herein.

It will now be appreciated that the light provided by the flash output arrangement 82 can be conditioned based on colour to provide a flash output that is generally consistent with the colour of the light. Thus, the flash output light reflected from the objects in the captured image is consistent with ambient lighting. A flash output consistent with the colour of the ambient light is advantageous for appropriate white balancing of the images captured. Further the luminance of the flash output can be conditioned based on a previously known luminance profile or based on the luminance of the field as determined at the image sensor. Thus, variance in luminance can be compensated for using the micro-projector to provide a more uniform luminance across the field, reducing the effect of, for example, unwanted vignetting. Further, uniformity of luminance can be improved in image fields that include a bright area resulting from reflection of the flash output, for example, from a reflective surface such as a stainless steel bowl or a glass surface. The flash output can be conditioned to compensate for these bright areas. Complex luminance contours can be compensated for using the present method. The compensation for variance in luminance and conditioning based on colour provides improved image quality.

Embodiments of the present application may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations for implementation may also be stored on the machine-readable medium. Software running from the machine-readable medium may interface with circuitry to perform the described tasks.

According to one aspect, there is provided a method of controlling a flash output for capturing an image in a portable electronic device having a digital camera. The method includes receiving light at an image sensor, determining a flash output adjusted for colour and brightness, providing the flash output, and capturing a resultant image at a digital image processor.

According to another aspect, there is provided a portable electronic device including a housing, an optical system connected to the housing for passing light therethrough, an image sensor for receiving light from the optical system, a flash output arrangement disposed in the housing for emitting a flash of artificial light, and a processing system for adjusting the flash output arrangement for colour and brightness based on the light received at the image sensor when capturing a digital image, and for capturing the digital image.

According to yet another aspect, there is provided a computer program product including a computer-readable medium having computer-readable code embodied therein for execution by a processor for causing an electronic device including a camera to control a flash output by receiving light at an image sensor, determining a flash output adjusted for colour and brightness based on the light received at the image sensor, providing the flash output, and capturing a resultant image at a digital image processor.

While the embodiments described herein are directed to particular implementations of the portable electronic device and the method of controlling the flash output, it will be understood that modifications and variations to these embodiments are within the scope and sphere of the present application. For example, it will be appreciated that the Figures depict one example of the portable electronic device and many other shapes and configurations are possible. The size and shape of many of the features can differ while still providing the same function. Many other modifications and variations may occur to those skilled in the art. All such modifications and variations are believed to be within the sphere and scope of the present application.

What is claimed:

1. A portable electronic device, comprising:
   an optical system for passing light;
   an image sensor for receiving ambient light from the optical system;
   a flash output arrangement, in optical communication with the image sensor, for emitting a flash of artificial light, the flash output arrangement comprising:
      a light source; and
      a micro-liquid crystal display for conditioning light from the light source; and
   a processing system coupled to the image sensor and the flash output arrangement for determining colour and luminance characteristics of the ambient light received at the image sensor and for controlling the micro-liquid crystal display to adjust the colour of the flash of artificial light based on the colour of the ambient light and to adjust luminance in localized areas by attenuating the light permitted to pass through localized areas of the micro-liquid crystal display to increase uniformity of brightness using the flash of artificial light, and for capturing the image.

2. The device of claim 1, wherein luminance in localized areas is adjusted, based on an expected luminance profile, by the processing system.

3. The device of claim 1, wherein the processing system comprises a controller for controlling the micro-liquid crystal display.

4. The device of claim 1, wherein the processing system comprises a digital signal processor for capturing the digital image.

5. The device of claim 1, wherein the flash output arrangement comprises a micro-projector.

6. The device of claim 1, wherein the image comprises a digital image.

7. The device of claim 1, wherein the light source comprises a light emitting diode.

8. A method of controlling a flash output for capturing an image in a portable electronic device having a digital camera, the method comprising:
   receiving ambient light at an image sensor;
   determining, utilizing a processing system, colour and luminance characteristics of the ambient light received at the image sensor;
   providing the flash output by conditioning light from a light source utilizing a micro-liquid crystal display to adjust the colour of the flash output based on the colour of the ambient light and to adjust luminance in localized areas by attenuating light permitted to pass through localized areas of the micro-liquid crystal display for increasing the uniformity of brightness using the flash output; and
   capturing the image at a digital image processor of the portable electronic device.

9. The method of claim 8, wherein the luminance in localized areas is adjusted based on an expected luminance profile.

10. The method of claim 8, wherein the processing system comprises a controller for controlling the micro-liquid crystal display.

11. The method of claim 8, wherein the processing system comprises a digital signal processor for capturing the digital image.

12. The method of claim 8, wherein the flash output arrangement comprises a micro-projector.

13. The method of claim 8, wherein the image comprises a digital image.

14. A method of fabricating a portable electronic device, comprising:
   providing an optical system for passing light;
   providing an image sensor for receiving ambient light from the optical system;
   providing a flash output arrangement, in optical communication with the image sensor, for emitting a flash of artificial light, the flash output arrangement comprising:
      providing a light source; and
      providing a micro-liquid crystal display for conditioning light from the light source; and
   providing a processing system coupled to the image sensor and the flash output arrangement for determining colour and luminance characteristics of the ambient light received at the image sensor and for controlling the micro-liquid crystal display to adjust the colour of the flash of artificial light based on the colour of the ambient light and to adjust luminance in localized areas by attenuating the light permitted to pass through localized areas of the micro-liquid crystal display to increase uniformity of brightness using the flash of artificial light, and for capturing the image.

15. The method of claim 14, wherein the luminance in localized areas is adjusted based on an expected luminance profile.

16. The method of claim 14, wherein the processing system comprises a controller for controlling the micro-liquid crystal display.

17. The method of claim 14, wherein the processing system comprises a digital signal processor for capturing the digital image.

18. The method of claim 14, wherein the image comprises a digital image.

19. A computer program product, comprising:
a computer-readable storage medium having computer-readable code embodied therein for execution by a processor, the processor
for determining colour and luminance characteristics of ambient light received at an image sensor,
for controlling a micro-liquid crystal display to adjust a colour of a flash of artificial light based on a colour of the ambient light and to adjust luminance in localized areas by attenuating the light permitted to pass through localized areas of the micro-liquid crystal display to increase uniformity of brightness using the flash of artificial light, and
for capturing an image.

* * * * *